United States Patent
Helm et al.

(10) Patent No.: US 6,847,827 B2
(45) Date of Patent: Jan. 25, 2005

(54) METHOD FOR MANAGING BANDWIDTH IN A PACKET-BASED COMMUNICATION SYSTEM USING CALL UNIT RESERVATIONS

(75) Inventors: David Helm, Carol Stream, IL (US); Brian Poe, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 488 days.

(21) Appl. No.: 09/728,620

(22) Filed: Dec. 1, 2000

(65) Prior Publication Data

US 2002/0072383 A1 Jun. 13, 2002

(51) Int. Cl.$^7$ .............................. H04B 7/00; H04Q 7/20
(52) U.S. Cl. ....................... 455/509; 455/450; 455/453; 370/322; 370/355; 370/443
(58) Field of Search ................................. 455/450, 451, 455/452.1, 452.2, 453, 454, 509, 510, 518, 520, 519; 370/322, 355, 431, 437, 439, 443, 352

(56) References Cited

U.S. PATENT DOCUMENTS

| | | | | |
|---|---|---|---|---|
| 5,832,300 A | * | 11/1998 | Lowthert | 710/33 |
| 5,970,416 A | * | 10/1999 | Ablay et al. | 455/510 |
| 6,272,127 B1 | * | 8/2001 | Golden et al. | 370/352 |
| 6,366,761 B1 | * | 4/2002 | Montpetit | 455/12.1 |
| 6,404,738 B1 | * | 6/2002 | Reininger et al. | 370/236 |
| 6,411,601 B1 | * | 6/2002 | Shaffer et al. | 370/230 |
| 6,563,793 B1 | * | 5/2003 | Golden et al. | 370/236 |
| 6,584,080 B1 | * | 6/2003 | Ganz et al. | 370/315 |
| 6,590,867 B1 | * | 7/2003 | Ash et al. | 370/236 |
| 6,628,943 B1 | * | 9/2003 | Agrawal et al. | 455/432.1 |

* cited by examiner

*Primary Examiner*—Simon Nguyen
(74) *Attorney, Agent, or Firm*—Steven R. Santema; Terri S. Hughes; Indira Saladi (57) ABSTRACT

Methods for reserving call units of bandwidth and for using the reserved call units to manage call requests are disclosed. Reservations are requested by a first host device (e.g., zone controller) for a path of a packet network communication system. The reservations are granted or denied by the network based on the availability of the requested bandwidth. Once a reservation has been obtained, the number of call units of bandwidth associated with the reservation may be reduced or increased by the network based, for example, on link failures, repairs, etc. Call requests are granted or denied by the zone controller based on the path(s) needed for the call, the number of reserved call units associated with the path(s) and the amount of call units required to support the call. If there are sufficient reserved call units to support the call, the call may proceed by sending, from a second host device (e.g., repeater), a message that is distributed over the number of units of bandwidth needed for the call.

18 Claims, 4 Drawing Sheets

METHOD FOR MANAGING BANDWIDTH IN A PACKET-BASED COMMUNICATION SYSTEM USING CALL UNIT RESERVATIONS

CROSS REFERENCE TO RELATED APPLICATIONS

This application is related to U.S. patent application Ser. No. 09/728,621, titled "Method for Managing Bandwidth in a Packet-Based Communication System, filed concurrently herewith, assigned to the assignee of the present invention and incorporated herein by reference in its entirety.

FIELD OF THE INVENTION

This invention relates generally to communication systems and, more particularly, to packet-based communication systems.

BACKGROUND OF THE INVENTION

Communication systems typically include a plurality of communication units, such as mobile or portable radio units and dispatch consoles that are geographically distributed among various repeater sites and console sites. The communication units wirelessly communicate with the repeater sites and each other, and are often logically divided into various subgroups or talkgroups. Communication systems may be organized as trunked systems, where a plurality of communication resources is allocated amongst multiple users or groups by assigning the repeaters within a radio frequency (RF) coverage area on a call-by-call basis, or as conventional (non-trunked) radio systems where communication resources are dedicated to one or more users or groups. In trunked systems, or in mixed trunked and conventional systems, there is usually provided a central controller (sometimes called a "zone controller") for allocating communication resources among multiple sites. The central controller may reside within a single device or multiple devices and may be located at a fixed equipment site or may be distributed among the repeater or console sites.

Traditionally, the repeater and console sites were linked via a circuit-switched architecture, through dedicated or on-demand circuits to a central radio system switching point ("central switch"). The circuits providing connectivity to the central switch required a dedicated wire for each endpoint (e.g., repeater site or console site) whether or not the endpoint was participating in a particular call. Often, the bandwidth (circuits) between endpoints were pre-provisioned for certain types of calls, for example for trunked calls and/or conventional calls. If a circuit was available for a trunking call, the zone controller reserved the circuit and granted the call. Otherwise, if a circuit was unavailable, the zone controller busied the call until such time as resources became available. For conventional calls, circuits were pre-allocated from the conventional channels to the central switch.

More recently, communication systems are using packet-switched networks where information that is to be communicated between endpoints is divided into packets and transported by various routers forming an Internet Protocol (IP) network. For example, communication systems using packet-switched networks are described and claimed in U.S. Pat. No. 6,141,347, titled "Wireless Communication System Incorporating Multicast Addressing and Method for Use" and U.S. patent application Ser. No. 09/464,269, titled "Methods for Implementing a Talkgroup Call in a Multicast IP Network," each of which is assigned to the assignee of the present invention and incorporated herein by reference in its entirety.

Packet-switched networks are sometimes called "connectionless" networks because they do not provide dedicated bandwidth or circuits between endpoints, but rather permit communications between multiple endpoints to proceed concurrently over shared paths or connections. U.S. patent application Ser. No. 09/728,621, titled "Method for Managing Bandwidth in a Packet-Based Communication System, assigned to the assignee of the present invention and incorporated herein by reference in its entirety, discloses and claims a method of call control in a packet-based network that allocates "call counts," or call units of bandwidth eligible for use on certain paths, such that calls may be established without exceeding available bandwidth. The present application discloses and claims a reservation-based method of determining call counts that may be utilized by zone controllers or other host devices of a communication network.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

The following describes a reservation-based method of determining call counts, or call units of bandwidth, that may be used to support calls between participating devices of a single or multi-zone packet-based communication network.

In one embodiment of the present invention, there is provided a method of obtaining, by a first host device (e.g., zone controller), reservations of call units of bandwidth on behalf of at least a second host device (e.g., repeater and/or other host devices) that may require use of bandwidth. The method comprises the first host device requesting a reservation of one or more call units of bandwidth for a path of a packet network communication system. One or more network devices (e.g., routers of the network) determine the availability of the requested bandwidth and grant (or deny) the reservation based on the availability of the requested bandwidth. Optionally, the first host may request additional call units of bandwidth if the reservation is granted or fewer call units of bandwidth if the reservation is denied, until such time as the first host is satisfied with the number of call units of bandwidth that are reserved for the path. Once a reservation has been obtained, the network devices may upwardly or downwardly adjust the reservation based on changes in the network such as link failures and the like. In another embodiment of the present invention, there is provided a method of managing call requests based on pre-established reservations of call units. The method comprises a first host device (e.g., zone controller) reserving one or more call units of bandwidth for a path of a packet network communication system. Upon receiving a call request that requires use of the path, the zone controller grants the call request if there are sufficient reserved call units to support the call. Thereafter, the call may proceed by sending, from a second host device (e.g., repeater), a message that is distributed over the number of units of bandwidth needed for the call, and the zone controller may adjust the number of reserved call units accordingly to manage additional call requests.

Figure 1:
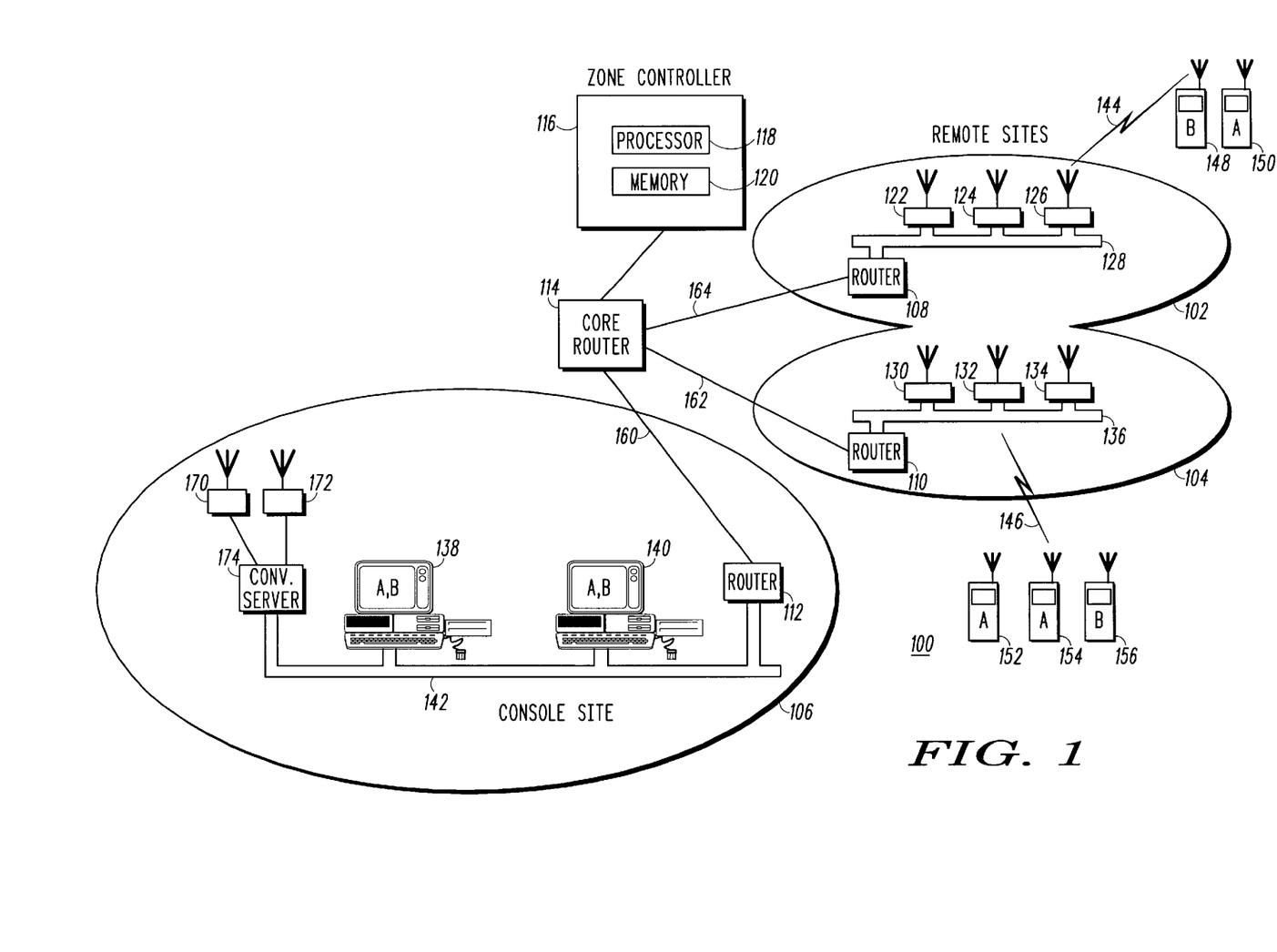
FIG. 1 is a block diagram of a packet-based communication system according to the invention.

Turning now to the drawings and referring initially to FIG. 1, there is shown a single-zone packet-based communication system 100 comprising a plurality of sites 102, 104, 106 that are logically coupled, via respective router elements 108, 110, 112 to a core router element 114. The router elements 108–114 may be embodied in separate physical devices, for example, 3Com "NetBuilder" series routers, or combinations of such devices. For convenience, the router elements will hereinafter be referred to as "routers." The core router 114 is coupled to a zone controller 116 having a processor 118 (such as a microprocessor, microcontroller, digital signal processor or combination of such devices) and a memory 120 (such as volatile or non-volatile digital storage devices or combination of such devices). The zone controller 116 may be linked, through the packet network, to zone controllers of other communication zones (not shown in FIG. 1). As disclosed and claimed in related patent application Ser. No. 09/728,621, the zone controller 116 manages and assigns call counts, or call units of bandwidth within the infrastructure of the communication system for routing payload (voice, data, video, etc.) and/or control messages that are to distributed between and among the various sites 102, 104, 106 and/or between communication zones.

As shown, the communication system 100 is a mixed trunking and conventional system. Site 102 includes a plurality of repeaters 122, 124, 126 ("trunking repeaters") that are assigned on a call-by-call basis to communication units 148, 150 within the radio frequency (RF) coverage area of site 102. Site 104 similarly includes a plurality of trunking repeaters 130, 132, 134 that are assigned on a call-by-call basis to communication units 152, 154, 156 within the coverage area of site 104. Site 106 includes a plurality of conventional repeaters 170, 172 that wirelessly communicate with communication units (not shown) in their coverage area via dedicated RF channels. The conventional repeaters 170, 172 are linked to the console site 106 by a conventional server 174.

The communication units 148–156 (sometimes called "subscriber units") may comprise mobile or portable wireless radio units and may be arranged into talk groups having corresponding talk group identifications as known in the art. Any number of talk groups having corresponding talk group identifications can be established within the system 100. In FIG. 1, for example, two separate talk groups are shown, identified by labels "A" and "B." Talk group "A" at least includes the communication units 150, 152, 154 and talk group "B" at least includes the communication units 148, 156. The communication system 100 may also support point-to-point calls, for example, between communication units 148 and 152.

Generally, the repeaters at sites 102, 104 communicate, via wireless communication resources 144, 146 with the communication units 148–156. Suitable wireless communication resources 144, 146 are multiple RF (radio frequency) channels such as pairs of frequency carriers, time division multiple access (TDMA) slots, code division multiple access (CDMA) channels, or any other RF transmission media. In the case where the communication resources comprise RF channels, it is common to assign separate channels and/or separate repeaters for different types of communication traffic. Thus, the repeaters at the various sites 102, 104 may comprise control channel repeaters, voice channel repeaters and/or link repeaters. For convenience, the term "repeater site" or simply "base site" will be used hereinafter instead of referring specifically to the repeater(s) at a particular site. The repeaters 122, 124, 126 are coupled, via Ethernet 128 to an associated router 108 and the repeaters 130, 132, 134 are coupled, via Ethernet 136 to router 110.

Site 106 includes a plurality of dispatch consoles 138, 140 that are coupled via Ethernet 142 to router 112 and defines a "console" site. Consoles 138, 140 may comprise wireless or wireline consoles. Console positions 138, 140 can affiliate with either, or both talkgroups "A" and "B" and, accordingly, may be considered members of both talk groups "A" and "B." In the illustrated embodiment, the console site includes a conventional server 174 connected to conventional repeaters 170, 172. As will be appreciated, conventional repeaters may be located at the repeater sites 102, 104 instead of or in addition to the console site 106. Of course, conventional repeaters may be eliminated entirely to define a pure trunking system. Moreover, it will be appreciated that a repeater site may include console positions, and vice versa.

Practitioners skilled in the art will appreciate that the network 100 may include various other communication devices not shown in FIG. 1. For example, the network 100 may include wireline communication device(s), site controller(s), comparator(s), telephone interconnect device (s), internet protocol telephony device(s), call logger(s), scanner(s) and gateway(s). Generally, such communication devices may be either sources or recipients of payload and/or control messages routed through the network 100. These devices are described briefly below.

A site controller is a device having a processor (such as a microprocessor, microcontroller, digital signal processor or combination of such devices) and a memory (such as volatile or non-volatile digital storage devices or combination of such devices), that may be located at a particular site. A site controller may be used to control the communication of payload and/or control messages between repeater(s) at a particular site. A site controller may also control communications between the repeater(s) and their associated router. In one embodiment, for example, a site controller sends IGMP Leave and Join messages to a router associated with a particular site to enable the repeater(s) at that site to receive payload and/or control messages addressed to particular multicast group address(es).

A comparator (or "voter") is a device, usually connected by wireline to various receivers (e.g., different repeaters) receiving different instance(s) of a particular message or signal (e.g., from a subscriber radio unit). The comparator receives and compares among the different instances of the signal that may be received by the different receivers, and produces an output message that is comprised of either an entire message from one of the receivers or a composite message comprised of segments of the message received from one or more of the receivers. Each message may be comprised of a plurality of message frames.

A scanner is a receiver that is adapted to monitor message transmissions from communication devices such as mobile or portable wireless radio units, consoles, repeaters, and the like. In one mode of operation, for example, a scanner scans the radio spectrum for the purpose of finding and, optionally, locking on to carrier frequencies containing message transmissions. Scanners are sometimes used by parties that are not intended recipients of the message transmissions and thus may or may not be members of a particular talkgroup for which the message transmissions are intended.

A telephone interconnect device is a network-based device that provides voice transcoding services between mobile and land line subscribers when invoking full duplex telephone calls between those two subscribers. A transcoding service is required, for example, when a mobile subscriber using ACELP vocoding requests a call to a subscriber in the public switched telephone network (PSTN) using 64-kilobit per second PCM vocoding.

An internet protocol telephony device comprises a telephone that transports voice and/or control messages over a LAN to a telephony gateway box, which interfaces multiple (LAN based) phones and converts the IP control and audio packets back into the format of the local PSTN. More generally, a gateway device is one that provides voice and control translation services between two dissimilar communication systems. For example, a gateway device would be required if an APCO system were to be connected to a GSM system. Other services such as feature translation, authentication, authorization and encryption could also be provided by a gateway device.

A call logger is a networked based device that records packetized voice talkgroup and private calls in a public safety system. A call logger could also record data calls. A call logger device typically stores the voice payload in its native format (i.e. vocoded audio). When it is desirable to playback the voice conversation at a later time, the call logger retrieves and decodes all packets which bound the call in question.

In one embodiment, the repeaters 122, 124, 126 and router 108 at site 102, the repeaters 130, 132, 134 and router 110 at site 104, the repeaters 170, 172, conventional server 174, consoles 138, 140 and router 112 at site 106, the core router 114 and zone controller 116, as well as any corresponding devices in different communication zones (not shown) are all IP host devices that are able to send and receive IP datagrams between other host devices of the network. Each host device has a unique IP address. The host devices include respective processors (which may comprise, for example, microprocessors, microcontrollers, digital signal processors or combination of such devices) and memory (which may comprise, for example, volatile or non-volatile digital storage devices or combination of such devices). The routers 108–114 are specialized or general purpose computing devices configured to receive IP packets or datagrams from a particular host in the communication system 100 and relay the packets to another router or another host in the communication system 100.

Figure 2:
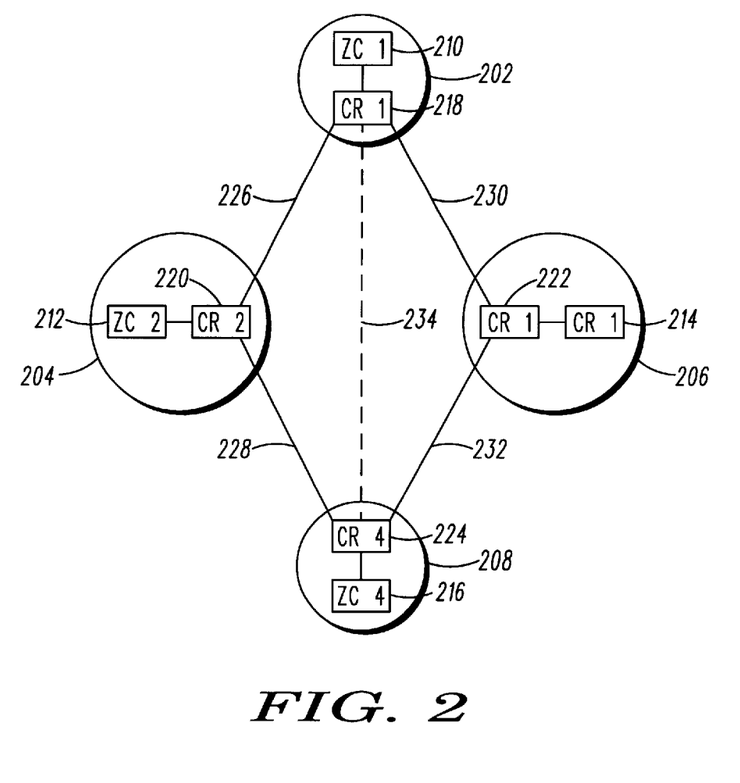
FIG. 2 is a block diagram useful for illustrating physical and virtual connections between core routers of a multi-zone packet-based communication system.

FIG. 2 illustrates a packet-based communication system 200 including zone controllers in multiple zones interconnected by various routers. As shown, there are four communication zones 202, 204, 206, 208, each having an associated zone controller and core router. Zone 202 includes zone controller 210 ("ZC 1") and core router 218 ("CR 1"); zone 204 includes zone controller 212 ("ZC 2") and core router 220 ("CR 2"); zone 206 includes zone controller 214 ("ZC 3") and core router 222 ("CR 3"); and zone 208 includes zone controller 216 ("ZC 4") and core router 224 ("CR 4"). Physical links between CR 1, CR 2, CR 3 and CR 4 are denoted by reference numerals 226–232. A virtual link between CR 1 and CR 4 is denoted by reference numeral 230. For convenience, only zone controllers, routers and inter-zone links are shown in FIG. 2, although it will be appreciated that each communication zone may include repeater/base station(s), console(s), site controller(s), comparator/voter(s), scanner(s), site controller(s), telephone interconnect device(s) or internet protocol telephony device (s), local router(s) and links between such devices, and each device may be a source or recipient of IP packets routed within the same zone or between different zones.

The core routers CR 1–4 and the local routers of each zone (not shown in FIG. 2) respond to addressing information in the IP packets received to properly route the packets to their intended destination. In accordance with internet protocol, the IP packets may be designated for unicast or multicast communication. Unicast is communication between a single sender and a single receiver over the network. Multicast is communication between a single sender and multiple receivers on a network. Each type of data communication is controlled and indicated by the addressing information included in the packets of data transmitted in the communication system 100. For a unicast message, the address of the packet indicates a single receiver. For a multicast communication, the address of the packet indicates a multicast group address to which multiple hosts may join to receive the multicast communication. In such case, the routers of the network replicate the packets, as necessary, and route the packets to the designated hosts via the multicast group address.

Related patent application Ser. No. 09/728,621 has described and claimed a method of call control using call counts, or call units of bandwidth between different endpoints of the communication system, managed by the zone controllers. Call counts may be allocated for different types of calls (e.g., trunking and conventional calls) for different possible paths between endpoints and then, call requests are granted, denied or busied, as appropriate based on the availability of the call units of bandwidth and/or the type of the call. As may be observed in FIG. 2, paths between zones may characterize different, alternative physical links. For example, packets that are to be routed between CR 1 and CR 4 may travel via physical links 226, 228 or alternatively, by physical links 230, 232. Due to the nature of packet switched networks, the zone controllers do not necessarily know (or care) which physical links will be used. Rather, the routers of the network determine the path that will be taken through the network, independent of the zone controllers. Accordingly, in one embodiment of the invention, the zone controllers determine call counts for virtual paths between zones (e.g., link 234, between CR 1 and CR 4), which may or may not coincide with actual physical links.

Figure 3:
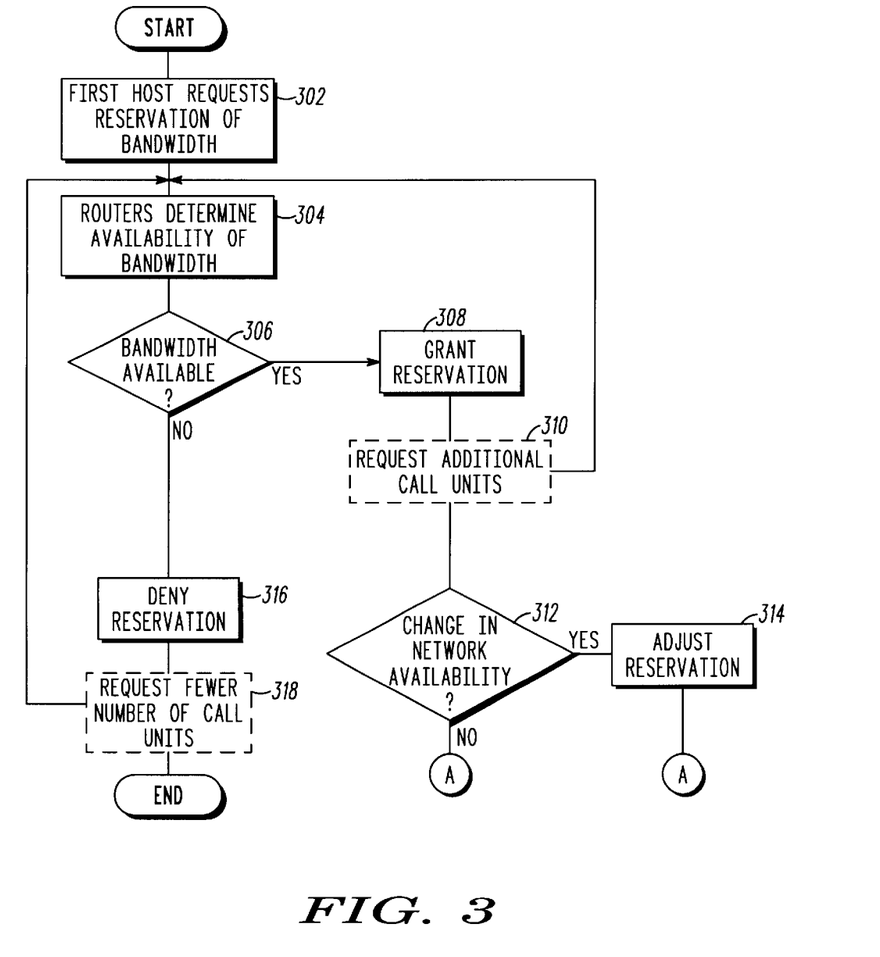
FIG. 3 is a flowchart showing a method of obtaining reservations of call counts in a packet-based communication system according to the invention.

FIG. 3 shows a method of a first host device establishing call count reservations according to one embodiment of the invention. The flowchart of FIG. 3 presumes that reservations are being established for a single path of a packet network communication system. The path comprises a virtual path between any endpoints (host devices) of a packet network communication system, including intra-zone or inter-zone paths (e.g., path 234). As will be appreciated, however, the steps of FIG. 3 may be repeated as often as necessary to establish call count reservations for multiple paths. The steps of FIG. 3 are implemented, where applicable, using stored software routines within the first host device and/or one or more network devices (e.g., routers).

The flowchart begins at step 302, with a first host device requesting a reservation from the network of one or more call units of bandwidth for the path. The reservations are requested by the first host device on behalf of other host devices that may need bandwidth to participate in later call(s). For example, in one embodiment, the first host device comprises a zone controller (e.g., zone controller 116) that requests reservations of call units eligible to be used by other host devices (e.g., repeaters, consoles, etc.) in its communication zone. In one embodiment, the reservations of call units are requested using standard RSVP signaling between the zone controller 116 and the routers of the network, upon start-up of the zone controller 116 and upon affiliations being received from communication units (e.g., communication units 148, 150) within the communication system 100. That is, reservations are requested so that they may be statically determined by the zone controller prior to receiving any call requests from participating host devices. Alternatively, reservations may be requested dynamically, on a call-by-call basis but in practical effect, RSVP signaling generally takes too long to be done for each call.

At step 304, one or more network devices determine the availability of the requested bandwidth. If the requested bandwidth is available (step 306), the network grants the reservation at step 308, thereby yielding one or more reserved call units for the path. In one embodiment, granted reservations obtained by the first host device are associated with one or more multicast group addresses that are not used for actual calls, as will be described in greater detail in relation to FIG. 4. Otherwise, if the requested bandwidth is unavailable, the network denies the reservation at step 318.

Optionally, after having a reservation request granted, the first host device may request additional call unit(s) of bandwidth at step 310. For any such requests, the network devices determine the availability of the requested call unit(s) at step 304 and, if they are available, grant reservation(s) for the incremental call units. For example, it is envisioned that a zone controller may wish to establish reservations for ten call units of bandwidth for a particular link. One manner in which this may be accomplished is to submit, one at a time, ten separate requests for single units of bandwidth. Depending on availability of the requested bandwidth, there may result ten separate reservations of one unit of bandwidth. Of course, the same effective bandwidth reservation might be achieved by submitting, for example, five requests for two units of bandwidth, or a single request for ten call units of bandwidth but the larger the request, the greater likelihood that the request will be denied.

Optionally, after having a request for multiple units of bandwidth denied, the first host device may request fewer number(s) of call units at step 318. If so, the network devices determine the availability of the revised number of requested call unit(s) at step 304 and, if they are available, grant reservation(s) for the revised number(s) of call units. If the revised number of requested call unit(s) is unavailable, the request is denied and the first host device may submit further revised requests until such time as a reservation is granted for the revised number of requested call units, or until the revised request comprises a request for a single call unit and that request is denied.

At step 312, if there is a change in network availability, for example, if a link breaks (or is fixed), the network devices may adjust the reservation upwardly or downwardly, as appropriate, at step 314. Alternatively, the network devices may break the reservation in response to a change in network status and notify the requesting host device (e.g., zone controller), thereby allowing the requesting host to submit additional requests in an attempt to re-establish reservations.

Figure 4:
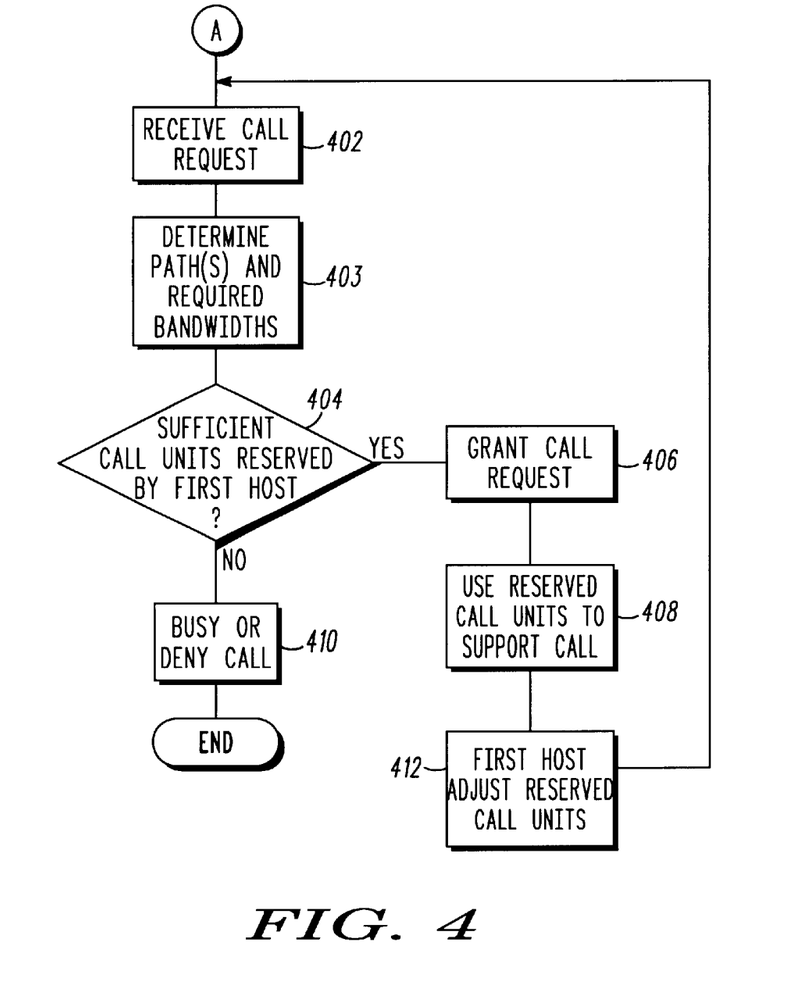
FIG. 4 is a flowchart showing a method of managing call requests based on pre-established reservations of call counts according to the invention.

Now turning to FIG. 4, there will be described a method of managing call requests based on pre-established reservations of call counts according to the invention. That is, the flowchart of FIG. 4 presumes that reservations of call units have been statically determined, by a first host (e.g., zone controller) prior to receiving any call requests. The steps of FIG. 4 are implemented, where applicable, using stored software routines within the first host and/or one or more participating host devices. At step 402, the zone controller receives a call request from a host device desiring to participate in a call. For example, with reference to FIG. 1, the zone controller 116 might receive a call request from repeater 126. Typically, call requests from repeaters are initiated by wireless communication units (e.g., communication unit 150) within the repeater's coverage area. Historically, wireless communication units are not IP host devices and, as such, do not directly communicate with the zone controller. Nevertheless, it is anticipated that some communication systems will extend IP host functionality to the communication units 148–156, in which case the communication units 148–156 may directly submit call requests to the zone controller.

At step 403, the zone controller determines the path(s) and the required call unit(s) of bandwidth needed to support the call. For purposes of the present example, assume that the call request is for a talk group call ("talk group A"). Based on mobility and talk group affiliations of the communication units, the zone controller 116 determines which endpoints need to participate in the call, which path(s) between endpoints are needed to support the call and the call units of bandwidth needed to support the call. Thus, for example, the zone controller might determine that repeater 126 at site 102, repeater 132 at site 104 and consoles 138, 140 at site 106 are the endpoints for the call, paths 160, 162 and 164 are needed to support the call and one, one, and two units of bandwidth are needed for the respective paths. Generally, the number of units of bandwidth needed for each path is a function of the number of endpoints served by that path and the type of call (e.g., audio vs. video calls). As will be appreciated, the endpoint(s) participating in the call may include host devices in other communication zones, in which case the path(s) between endpoints will include inter-zone links (see FIG. 2) as well as intra-zone link(s).

At step 404, the zone controller determines whether the call units of bandwidth reserved for the path(s) are sufficient to support the call, that is if the number of units of bandwidth needed for the call does not exceed the units of bandwidth reserved by the zone controller. If there are sufficient reserved call units to support the call, the zone controller grants the call request at step 406. In one embodiment, upon granting a call request, the zone controller 116 forwards a multicast group address to the participating endpoints, via the core router 114 and local routers 108, 110, 112. The endpoints send Internet Group Management Protocol (IGMP) Join messages to their respective local routers, which are forwarded to the core router 114 to form a spanning tree of router interfaces logically connecting the participating hosts. In the present example for talk group A, the spanning tree of router interfaces would include links 160, 162, 164 between the local routers and the core router. Then, at step 408, the devices having joined the multicast group address participate in a call, thereby using at least a portion of the call units of bandwidth that were reserved by the zone controller. Thus, continuing the present example, the repeater 126 at site 102 may send a message (e.g., audio, video, etc.) on the multicast group address, which message is distributed over the number of units of bandwidth needed for the call and may be received by the repeater 132 at site 104 and the consoles 138, 140 at site 106 once they have successfully joined the multicast group address.

In one embodiment, the multicast group address(es) used for the actual calls differs from the address(es) that the reservations are on. Thus, for example, the zone controller may have obtained reservations for ten call units for a particular path, associated with a corresponding ten multicast group addresses. However, upon granting call request (s), the zone controller forwards different multicast group addresses to the participating devices.

Alternatively, if there are sufficient call units of bandwidth available for some but not all of the required paths, the zone controller may send the multicast group address to only those endpoints of the paths where sufficient bandwidth is available. Thereafter, upon those endpoints joining the multicast group address, a spanning tree of router interfaces may be formed that includes the path(s) where sufficient bandwidth is available but does not include paths where sufficient bandwidth is not available. In either case, at step 408, the devices having joined the multicast group address participate in a call, thereby using at least a portion of the call units of bandwidth that were reserved by the zone controller.

At step 412, the zone controller adjusts the number of reserved call units accordingly, based on the number of reserved call units that are "in use." Thus, for example, if ten call units of bandwidth were reserved for a particular path, and call requests have been granted that require two units of bandwidth, the zone controller will consider that it has eight remaining reserved call units. Conversely, the number of reserved call units may be upwardly adjusted as active calls are terminated.

If, at step 404, the zone controller determines that there are not enough reserved call units of bandwidth to support a call request, the call is busied or denied at step 410. Alternatively, although not shown in FIG. 4, the zone controller may pre-empt active calls and/or "borrow" call units reserved for other calls, for example, using methods disclosed and claimed in related patent application Ser. No. 09/728,621.

The present disclosure has thus identified methods for establishing static reservations of call counts, or call units of bandwidth, by a zone controller on behalf of other communication devices. The call count reservations enables the zone controller, with minimal topology information, to manage bandwidth allocations and link failures between host devices in the same or in different communication zones and guarantees that links will not be over-utilized due to excessive calls.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a packet network communication system comprising a plurality of host devices logically connected by one or more paths, a method comprising:
    receiving a reservation request, from a first group of devices, for one or more call units of bandwidth for a path from the one or more paths;
    determining an availability of the requested one or more call units of bandwidth for the path; and
    in response to a positive determination of availability, granting the reservation, yielding a reserved one or more call units of bandwidth for the path,
    wherein the first group of devices requests the reservation on behalf of a second group of devices, wherein the first group of devices and the second group of devices each comprise at least one host device from the plurality of host devices, wherein the first group of devices is exclusive of the second group of devices, and wherein the reserved one or more call units of bandwidth is used to support a call initiated by one of the host devices in the second group of devices and
    wherein the first group of devices of the plurality of host devices of the packet network communication system comprises a zone controller for routing payload and control messages of the communication system whereby the communication system comprises dedicated RF channels.

2. The method of claim 1, further comprising, after the step of granting the reservation:
    transmitting a downwardly adjusted availability of the reserved one or more call units of bandwidth.

3. The method of claim 1, further comprising, after the step of granting the reservation:
    transmitting an upwardly adjusted availability of the reserved one or more call units of bandwidth.

4. A method comprising:
    reserving, by a first host device, one or more call units of bandwidth for a path of a packet network communication system for use by at least a second host device;
    receiving, by the first host device, a call request from the second host device that requires use of the path; and
    granting the call request by the first host device if a number of units of bandwidth needed for the call by the second host device does not exceed the one or more call units of bandwidth reserved by the first host device,
    wherein the second host device sends a massage that is distributed over the number of units of bandwidth needed for the call to at least a third host device and
    wherein the first host device of the packet network communication system comprises a zone controller for routing payload and control messages of the communication system whereby the communication system comprises dedicated RF channels.

5. The method of claim 4, wherein the first host device is a zone controller and the second host device is a repeater.

6. The method of claim 4 wherein the path comprises a path between routers in different communication zones.

7. A method comprising:
    requesting, by a zone controller associated with a first communication zone, a reservation of one or more call units of bandwidth for a path of a packet network communication system comprising dedicated RF channels whereby the zone controller routes payload and control messages in the communication system;
    determining, by one or more network devices, an availability of the requested one or more call units of bandwidth for the path;
    in response to a positive determination of availability, granting the reservation, yielding a reserved one or more call units of bandwidth for the path that is available to support a call including participating host devices in at least the first communication zone.

8. The method of claim 7, comprising:
    receiving, by the zone controller from a repeater in the first communication zone, a call request that requires use of the path;

granting, by the zone controller, the call request if a number of units of bandwidth needed for the call does not exceed the reserved one or more call units of bandwidth; and sending, from the repeater to one or more participating devices for the call, a message distributed over the number of units needed for the call.

9. The method of claim 8 comprising, after the step of granting the call request, subtracting the number of units needed for the call from the reserved one or more call units of bandwidth, yielding an adjusted reservation of one or more call units of bandwidth.

10. In a packet network communication system including a plurality of host devices logically connected by one or more paths, a method comprising, from a first group of devices:

requesting a reservation on behalf of a second group of devices for one or more call units of bandwidth for a path from the one or more paths, wherein the first group of devices and the second group of devices each comprise at least one host device from the plurality of host devices, and wherein the first group of devices is exclusive of the second group of devices; and if the request for reservation is granted, receiving a reservation grant yielding a reserved number of call units of bandwidth for the path, and managing the reserved number of call units of bandwidth available for use by the second group of devices and wherein the first group of devices of the plurality of host devices of the packet network communication system comprises a zone controller for routing payload and control messages of the communication system whereby the communication system comprises dedicated RF channels.

11. The method of claim 10, wherein the step of requesting a reservation comprises consecutively requesting single call units of bandwidth for the path until the reservation request is denied.

12. The method of claim 10, further comprising, if the request for reservation is granted, requesting an additional one or more call units of bandwidth for the reservation.

13. The method of claim 10, wherein the first group of devices comprises a zone controller in a first communication zone, and the step of requesting a reservation being accomplished by the zone controller on behalf of a communication device in the first communication zone.

14. The method of claim 10 further comprising, if the request for reservation is denied, requesting a subsequent reservation for a smaller number of call units of bandwidth than previously requested.

15. The method of claim 14, wherein the step of requesting a subsequent reservation is repeated one or more times until the subsequent reservation is granted.

16. The method of claim 14, wherein the step of requesting a subsequent reservation is repeated one or more times until the subsequent reservation is denied in response to a request for a single call unit of bandwidth.

17. The method of claim 10, further comprising, if the request for reservation is granted:

receiving a downwardly adjusted availability of the reserved one or more call units of bandwidth; and decreasing the number of reserved call units.

18. The method of claim 10, further comprising, if the request for reservation is granted:

receiving an upwardly adjusted availability of the reserved one or more call units of bandwidth; and increasing the number of reserved call units.

* * * * *

UNITED STATES PATENT AND TRADEMARK OFFICE
CERTIFICATE OF CORRECTION

PATENT NO.    : 6,847,827 B2
DATED         : January 25, 2005
INVENTOR(S)   : Helm et al.

It is certified that error appears in the above-identified patent and that said Letters Patent is hereby corrected as shown below:

Column 10,
Line 37, change "massage" to -- message --

Signed and Sealed this

Twenty-sixth Day of July, 2005

JON W. DUDAS
*Director of the United States Patent and Trademark Office*